US007551894B2

(12) United States Patent
Gerber et al.

(10) Patent No.: US 7,551,894 B2

(45) Date of Patent: Jun. 23, 2009

(54) WIRELESS MICROPHONE

(75) Inventors: Louis Gerber, Bern (CH); Stefan Gysin, Bern (CH)

(73) Assignee: Phonak Communications AG, Courgevaux (CH)

( * ) Notice: Subject to any disclaimer, the term of this patent is extended or adjusted under 35 U.S.C. 154(b) by 887 days.

(21) Appl. No.: 10/680,518

(22) Filed: Oct. 7, 2003

(65) Prior Publication Data

US 2005/0075149 A1 Apr. 7, 2005

(51) Int. Cl.
*H04B 7/00* (2006.01)

(52) U.S. Cl. .................. 455/41.2; 455/66.1; 455/556.1; 455/557; 381/122

(58) Field of Classification Search ................. 455/557, 455/41.2, 66.1, 556.1; 381/122
See application file for complete search history.

(56) References Cited

U.S. PATENT DOCUMENTS 4,259,547 A * 3/1981 Valley et al. ............... 381/23.1
4,916,532 A * 4/1990 Streck et al. ................ 348/723
4,918,736 A * 4/1990 Bordewijk .................. 381/315
5,210,803 A * 5/1993 Martin et al. ............... 381/315
5,323,257 A * 6/1994 Abe et al. .................. 398/129
5,479,479 A * 12/1995 Braitberg et al. ......... 455/404.1
5,721,783 A * 2/1998 Anderson ................... 381/328
5,966,639 A * 10/1999 Goldberg et al. ........... 455/11.1
6,025,553 A * 2/2000 Lee ............................ 84/610
6,029,072 A * 2/2000 Barber ........................ 455/557
6,311,155 B1 * 10/2001 Vaudrey et al. ............. 704/225
6,427,078 B1 * 7/2002 Wilska et al. ............ 455/550.1
6,520,776 B1 * 2/2003 Furukawa ............... 434/307 A
6,526,287 B1 * 2/2003 Lee ......................... 455/556.1
6,529,742 B1 * 3/2003 Yang ....................... 455/556.1
6,681,120 B1 * 1/2004 Kim ........................ 455/556.1
6,690,947 B1 * 2/2004 Tom ........................ 455/556.1
6,702,584 B2 * 3/2004 Ueshima et al. ......... 434/307 A
6,731,762 B1 * 5/2004 Chiang ........................ 381/92
6,839,447 B2 * 1/2005 Nielsen et al. .............. 381/312
6,851,952 B2 * 2/2005 Ueshima et al. ......... 434/307 A
6,965,069 B2 * 11/2005 Le-Faucheur et al. .......... 84/659
7,050,783 B2 * 5/2006 Curtiss et al. ............ 455/404.1

(Continued)

FOREIGN PATENT DOCUMENTS

FR 2 779 598 A 10/1999

(Continued)

*Primary Examiner*—Matthew D Anderson
*Assistant Examiner*—April S Guzman
(74) *Attorney, Agent, or Firm*—Pearne & Gordon LLP

(57) ABSTRACT

A wireless microphone (1) comprises a radio transmitter for transmitting radio signals carrying audio signals to a hearing device. The wireless microphone (1) further comprises at least one coupling element (11) for detachably fixing one of various interchangeable functional modules (2) to the wireless microphone (1). The coupling element (11) is designed to fix the interchangeable functional module (2) to the wireless microphone (1) by mating with a coupling element (21) of the interchangeable functional module (2). The coupling elements (11, 21) comprise electrical contacts (12, 22) for electrically connecting the interchangeable functional module (2) to the wireless microphone (1) when the interchangeable functional module (2) is fixed to the wireless microphone (1) by means of said coupling elements (11, 21). The coupling element (11) constitutes a bidirectional electrical interface between the wireless microphone (1) and the interchangeable functional module (2). The wireless microphone (1) can be limited to an assistive listening device with basic functions and features, extendible by the user with extra functions and features as needed.

11 Claims, 1 Drawing Sheet

U.S. PATENT DOCUMENTS

| | | | | |
|---|---|---|---|---|
| 7,107,071 | B1 * | 9/2006 | Kwon et al. | 455/556.1 |
| 7,120,462 | B2 * | 10/2006 | Kumar | 455/556.1 |
| 7,123,936 | B1 * | 10/2006 | Rydbeck et al. | 455/557 |
| 2001/0029192 | A1 * | 10/2001 | Oh | 455/556 |
| 2001/0031622 | A1 * | 10/2001 | Kivela et al. | 455/11.1 |
| 2001/0041588 | A1 * | 11/2001 | Hollstrom et al. | 455/556 |
| 2002/0001391 | A1 * | 1/2002 | Darbut | 381/122 |
| 2002/0173339 | A1 * | 11/2002 | Safadi | 455/553 |
| 2005/0069160 | A1 * | 3/2005 | Kehoe | 381/312 |
| 2006/0093172 | A1 * | 5/2006 | Ludvigsen et al. | 381/315 |
| 2006/0233395 | A1 * | 10/2006 | Orten | 381/122 |
| 2006/0258398 | A1 * | 11/2006 | May et al. | 455/556.1 |
| 2007/0064959 | A1 * | 3/2007 | Boothroyd | 381/92 |

FOREIGN PATENT DOCUMENTS

| | | |
|---|---|---|
| WO | 94 24775 | 10/1994 |
| WO | 94 29968 | 12/1994 |
| WO | WO 03056875 A1 * | 7/2003 |

* cited by examiner

WIRELESS MICROPHONE

BACKGROUND OF THE INVENTION

The present invention relates to a wireless microphone; specifically, the present invention relates to a wireless microphone comprising a radio transmitter for transmitting radio signals carrying audio signals to a hearing device.

Wireless microphones are used as assistive listening devices for transmitting sound from the sound source directly to a hearing device arranged in or at a person's ear, whereby the signal-to-noise ratio is greatly improved. The wireless microphones currently available for that purpose comprise radio transmitters for transmitting radio signals that carry audio signals to a radio receiver of a hearing aid, for example a behind-the-ear (BTE) hearing instrument, or to a radio receiver with an electro-acoustic converter reproducing the sound directly into the ear. Common applications of wireless microphones as assistive listening devices include applications in schools, where the teacher wears the wireless microphone and the hearing impaired student wears a receiver connected to his hearing aid. The wireless microphone is also used in business meetings or in restaurants, where the wireless microphone is placed on a table. The wireless microphones are also useful for listening to the sound of a television or a stereo set without turning up the volume. Typically, the known wireless microphones suitable as assistive listening devices are equipped to receive electrical audio signals through wire connections from external audio sources such as a television or a stereo set. However, the users often find the connective wires not very practical. Because the wireless microphone needs to be placed at wire's length from the audio source, the wireless microphone is not always within reach of the user. The known wireless microphones often comprise omnidirectional and/or beam-forming microphones. Moreover, for recharging the power source, the known wireless microphones comprise charging circuits. Although these additional features are not used all the time, they consume power and the components used for their implementation increase the weight of the wireless microphone. Other features or functions which could be of interest to the users are currently not available and cannot be added to the known wireless microphones.

SUMMARY OF THE INVENTION

It is an object of this invention to provide a wireless microphone which is suitable as an assistive listening device but does not have the disadvantages of the prior art, particularly a wireless microphone with a radio transmitter for transmitting audio signals to a hearing device.

According to the present invention, the above-mentioned objects are achieved in particular in that a wireless microphone comprising a radio transmitter for transmitting radio signals carrying audio signals to a hearing device is provided with at least one coupling element for detachably fixing one of various interchangeable functional modules to the wireless microphone, said coupling element comprising electrical contacts for electrically connecting the interchangeable functional module to the wireless microphone when the interchangeable functional module is fixed to the wireless microphone by means of said coupling element. As the coupling element makes it possible to fix and connect different functional modules to the wireless microphone, the wireless microphone can be limited to an assistive listening device with basic functions and features, extendible by the user with extra functions and features as needed. The user can easily adapt the functionality of the assistive listening device to the requirements of a new situation by fixing (and thereby connecting) a desired functional module to the wireless microphone. The wireless microphone and an additional functional module fixed and connected thereto can be carried comfortably by the user as one unit.

In a preferred embodiment, the coupling element constitutes a bidirectional electrical interface between the wireless microphone and the interchangeable functional module fixed to the wireless microphone. Particularly, electronic modules of the wireless microphone are connected to one or more of the electrical contacts for bidirectional exchange of electrical signals between said electronic modules and the interchangeable functional module fixed to the wireless microphone. Thus, the bidirectional electrical interface makes it possible to transfer electrical signals from an external functional module to the wireless microphone, particularly to an electronic module of the wireless microphone, as well as from the wireless microphone to the external functional module, particularly from an electronic module of the wireless microphone. For example, audio signals received by the wireless microphone can be routed through a functional module for special processing, before being transmitted to the receiver of the hearing device.

In a preferred embodiment, the coupling element is designed to fix the interchangeable functional module to the wireless microphone by mating with a coupling element of the interchangeable functional module. Mating of the coupling elements, for example in a tight or snap-in fit, causes the wireless microphone and the fixed functional module to mechanically interlock so that they are not accidentally separated.

In an embodiment, the wireless microphone comprises an electronic control module which is connected to one or more of the electrical contacts for exchanging electrical control signals with the interchangeable functional module fixed to the wireless microphone. For example, the wireless microphone comprises operating elements connected to the control module and the control module is designed for transferring electrical control signals, in response to operation of said operating elements, to the interchangeable functional module fixed to the wireless microphone. Consequently, a user using the operating elements of the wireless microphone can set operating parameters in a fixed functional module or control operation of the fixed functional module. In another example, the wireless microphone is designed to transfer electrical control signals to the radio transmitter for transmission to the hearing device. As a result, control signals received in the control module from a fixed functional module can be passed to the hearing device for setting operational parameters in the hearing aid.

In an embodiment, the wireless microphone comprises an electronic audio processing module which is connected to one or more of the electrical contacts for exchanging electrical audio signals with the interchangeable functional module fixed to the wireless microphone. It is thus possible to use an interchangeable functional module as an audio source in that electrical audio signals from the functional module are received in the electronic audio processing module and transmitted to the hearing device. In reverse direction, it is possible is to transfer electrical audio signals from the electronic audio processing unit to the functional module, for example for further processing.

In an embodiment, the electronic audio processing module is connected to one or more of the electrical contacts for receiving electrical control signals from the interchangeable functional module fixed to the wireless microphone. Therefore, it is possible to control operation of the electronic audio processing module through control signals from the interchangeable functional module.

In an embodiment the radio transmitter is connected to one or more of the electrical contacts for exchanging electrical signals with the interchangeable functional module fixed to the wireless microphone. In this way, electrical signals from the radio transmitter can be transferred to a special antenna, for example, located in the fixed functional module.

In an embodiment the wireless microphone comprises a power source module connected to one or more of the electrical contacts for supplying power to the interchangeable functional module fixed to the wireless microphone and/or for receiving power from the interchangeable functional module fixed to the wireless microphone.

BRIEF DESCRIPTION OF THE DRAWINGS

The present invention will be explained in more detail, by way of example, with reference to the drawings in which.

DETAILED DESCRIPTION OF THE PREFERRED EMBODIMENTS

In the following description the term audio signal refers to acoustic signals audible to humans, typically in the range of 100 Hz to 8 KHz or, in the case of high fidelity electronic devices, in the extended range of 20 Hz to 20 KHz. The term electrical audio signal refers to electrical signals representing audio signals in analogue or encoded form.

Figure 1:
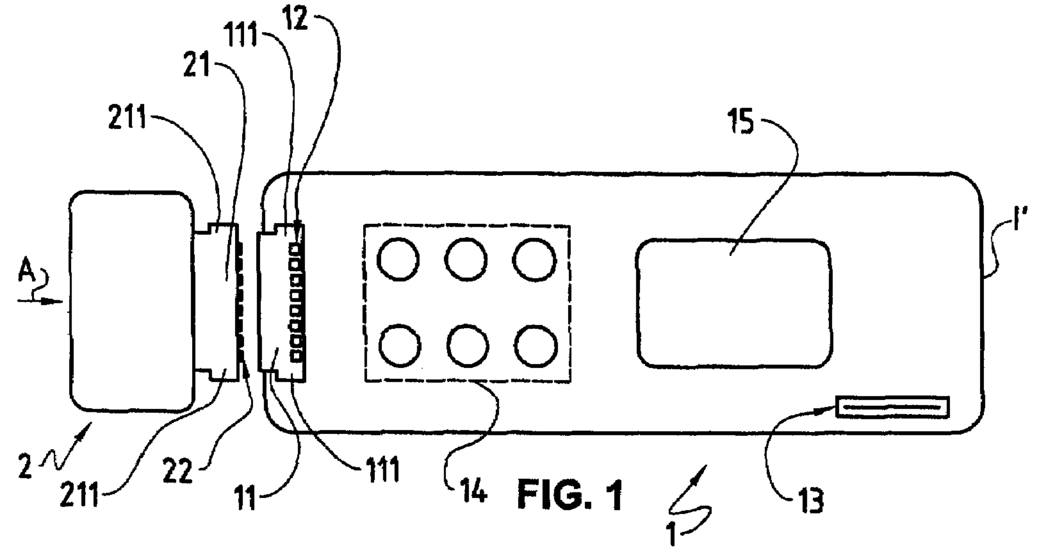
FIG. 1 shows a top view of a wireless microphone and an interchangeable functional module, the wireless microphone and the functional module each having a coupling element for fixing the functional module to the wireless microphone.
Figure 2:
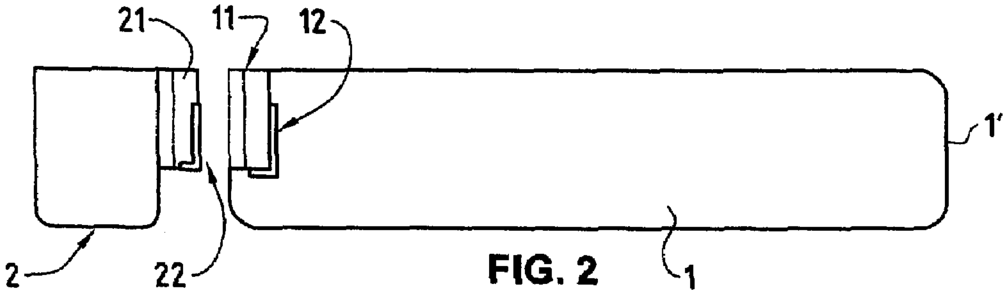
FIG. 2 shows a cross section of the wireless microphone and the interchangeable functional module along arrow A shown in FIG. 1.
Figure 3:
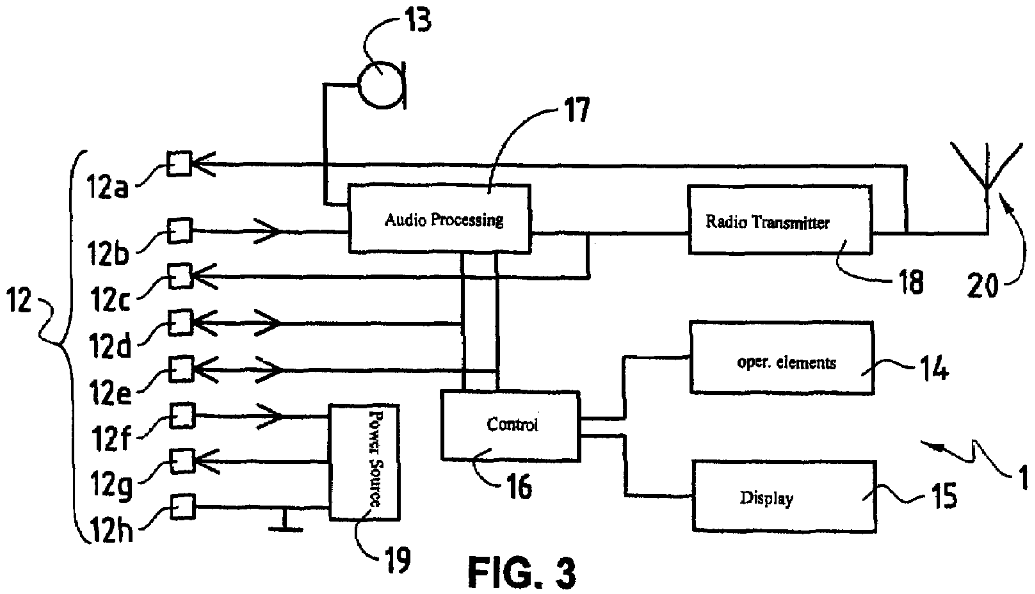
FIG. 3 shows a block diagram illustrating functional blocks of the wireless microphone and their interconnection with electrical contacts of the coupling element.

In the FIGS. 1, 2 and 3, the reference numeral 1 refers to a wireless microphone having a housing 1' and a microphone element 13 for receiving audio signals from sound sources. As can be seen in FIGS. 1 and 3, the wireless microphone 1 also includes user interface comprising operating elements 14, such as push buttons, and a display 15.

As is illustrated in FIGS. 1 and 2, the wireless microphone 1 comprises a coupling element 11 for detachably fixing an interchangeable functional module 2 to the wireless microphone 1. The coupling element 11 is designed to fix the interchangeable functional module 2 to the wireless microphone 1 by mating with a coupling element 21 of the interchangeable functional module 2. Preferably, the coupling element 21 is implemented as a counterpart complementary to the coupling element 11 of the wireless microphone 1. In the embodiment illustrated in FIGS. 1 and 2, the coupling element 11 is executed as an undercut clearance in the housing 1' of the wireless microphone 1, the undercut being formed by lateral recesses 111 in the clearance. The coupling element 21 of the functional module 2 is executed as a protrusion fitting in the clearance in the housing 1' of the wireless microphone 1, lateral protrusions 211 of the coupling element 21 fitting the lateral recesses 111 of the coupling element 11. One skilled in the art will understand that there are alternative methods for mechanically coupling the wireless microphone 1 and the functional module 2. Moreover, one skilled in the art will understand that wireless microphone 1 can be provided with more than one coupling element 11 for detachably fixing more than one interchangeable functional module 2 to the wireless microphone 1.

As is illustrated in FIGS. 1, 2 and 3, the wireless microphone 1 comprises electrical contacts 12 for electrically connecting an interchangeable functional module 2 to the wireless microphone 1. Likewise, the interchangeable functional module 2 comprises corresponding electrical contacts 22 for electrical connection with the wireless microphone 1. The electrical contacts 12, 22 are arranged in the coupling element 11, respectively 21, so that electrical connections are established between the electrical contacts 12 of the wireless microphone 1 and the corresponding electrical contacts 22 of the functional module 2 when the coupling element 21 of the functional module 2 is engaged with the coupling element 11 of the wireless microphone 1. Thus, when the interchangeable functional module 2 is mechanically fixed to the wireless microphone 1, electrical connections are established automatically between the electrical contacts 12 of the wireless microphone 1 and the corresponding electrical contacts 22 of the functional module 2; consequently, the functional module 2 is electrically connected to the wireless microphone 1.

In FIG. 3, the reference numeral 17 refers to an electronic audio processing module. The audio processing module 17 is connected to the microphone element 13, to an electronic control module 16 and to a radio transmitter 18. The audio processing module 17 includes signal processing functions such as parametric filter functions and amplification functions.

The radio transmitter 18 is designed for transmitting radio signals carrying audio signals received from the audio processing module 17 to a receiver of a hearing device or a headphone. In addition to the radio receiver, the hearing device comprises an electro-acoustic converter for reproducing the sound directly into the ear or a parametric hearing aid. The radio transmitter 18 is preferably a low power radio transmitter with a transmitting power in the range of 0.1 milliwatts to 100 milliwatts, suitable for transmitting audio signals over a distance of approximately 10 to 100 meters. The output of the radio transmitter 18 is connected to an internal antenna 20. For connection with an external antenna of an interchangeable functional module 2 connected to the wireless microphone 1, the output of the radio transmitter 18 is connected to the electrical contact 12*a*.

The electronic modules of the wireless microphone 1 are preferably integrated as an integrated circuit. It is also possible to build the electronic modules from several separate electronic components. Various functions of the electronic modules can be implemented by means of non-programmable logic circuits, by means of programmable logic circuits or by means of a combination of a processor and program code.

The control module 16 is connected to the operating elements 14 and to the display 15. In response to instructions and parameter values received from a user via the operating elements 14, the control module 16 transfers control signals including instructions and/or parameter values to the audio processing module 17 and/or via the electronic contacts 12*d*, 12*e* to a functional module 2 connected to the wireless microphone 1. The control module 16 is designed for bidirectional exchange of control signals with the connected functional module 2, i.e. control signals from the functional module 2 can also be transferred to the control module 16. Control signals from the functional module 2 can also be transferred directly to the audio processing module 17.

As is illustrated in FIG. 3, the input of the audio control module 17 is connected to the electrical contact 12*b* for receiving electrical audio signals from a functional module 2 connected to the wireless microphone 1. Furthermore, the output of the audio control module 17 is connected to the electrical contact 12$c$ for transferring electrical audio signals from the audio control module 17 to the functional module 2 connected to the wireless microphone 1. The audio control module 17 is designed for transferring control signals received from the control module 16 or from the functional module 2 to the radio transmitter 18 for transmission to the receiver of the hearing aid. Control signals may be transmitted to the hearing aid on a carrier frequency different from the one used to transmit the audio signals to the hearing aid.

In FIG. 3, the reference numeral 19 refers to a power source module, preferably a rechargeable battery. For recharging the power source module 19 by means of an interchangeable functional module 2 connected to the wireless microphone 1, a positive charging line and a negative supply line of the power source module 19 are connected to the electrical contacts 12$f$ and 12$h$, respectively. For supplying power to a functional module 2 connected to the wireless microphone 1, a positive supply line of the power source module 19 is connected to the electrical contact 12$g$.

Aside from an interchangeable functional module 2 comprising a charging circuit or an external antenna, a variety of interchangeable functional modules 2 with different functions can be fixed and connected to the wireless microphone 1. One of the interchangeable communication modules 2 includes a communication module for communicating over a mobile network, for example a GSM—(Global System for Mobile Communication) or a UMTS-network (Universal Mobile Telephone System). Other interchangeable communication modules 2 include an interface module for communicating with another communication device over a short distance of approximately 5 to 25 meters, for example infrared and/or radio interfaces, e.g. a so-called Bluetooth interface, for communicating bidirectionally with a remote control unit or a communication device such as a mobile telephone. Other interchangeable functional modules 2 include receivers for receiving audio or control signals via wire, infrared, induction, ultrasound, or radio connections from devices such as a stereo set, a television set, a security alarm system, or a remote control unit for the wireless microphone 1 or the receiver of the hearing device. Another interchangeable communication module 2 includes an audio recorder and/or an audio player for recording audio signals on a data carrier and/or for replaying audio signals from a data carrier, respectively, for example an MP3 player (MPEG3, Moving Picture Expert Group). Still other interchangeable communication modules 2 include external microphones, for example omnidirectional or directional microphones, external power supplies, such as a battery pack or a solar cell, or external audio signal processing units with special purpose processing functions not available in the audio processing module 17 of the basic wireless microphone 1.

What is claimed is:

1. An assistive listening device, comprising:

a wireless microphone adapted to be carried by an individual, comprising a rechargeable battery for powering the wireless microphone, a microphone element for receiving audio signals from sound sources, a radio transmitter for transmitting radio signals carrying audio signals to a hearing aid carried by another individual who is located remote from the wireless microphone, and an antenna operatively connected to the radio transmitter, wherein the wireless microphone comprises at least one coupling element for detachably fixing one of various interchangeable functional modules to the wireless microphone, said coupling element comprising electrical contacts for electrically connecting the interchangeable functional module to the wireless microphone when the interchangeable functional module is fixed to the wireless microphone by means of said coupling element, and wherein the interchangeable functional modules include a charging module for recharging the rechargeable battery and communication modules for providing the assistive listening device with wireless communications over a plurality of networks, each communication module including a module antenna for transmitting and receiving wireless communications over a network, and wherein each communication module is adapted to communicate over a different network, and further wherein the charging module and the communication modules can be interchangeably operatively connected to the wireless microphone through said coupling element.

2. The assistive listening device according to claim 1, wherein the coupling element constitutes a bidirectional electrical interface between the wireless microphone and the interchangeable functional module fixed to the wireless microphone.

3. The assistive listening device according to claim 1, wherein the coupling element is designed to fix the interchangeable functional module to the wireless microphone by mating with a coupling element of the interchangeable functional module.

4. The assistive listening device according to claim 1, wherein electronic modules of the wireless microphone are connected to one or more of the electrical contacts for bidirectional exchange of electrical signals between said electronic modules and the interchangeable functional module fixed to the wireless microphone.

5. The assistive listening device according to claim 1, wherein the wireless microphone comprises an electronic control module, said electronic control module being connected to one or more of the electrical contacts for exchanging electrical control signals with the interchangeable functional module fixed to the wireless microphone.

6. The assistive listening device according to claim 5, wherein the wireless microphone comprises operating elements, said operating elements being connected to the control module, and said control module being designed for transferring electrical control signals to the interchangeable functional module fixed to the wireless microphone in response to operation of said operating elements.

7. The assistive listening device according to claim 1, wherein the wireless microphone comprises an electronic audio processing module, said electronic audio processing module being connected to one or more of the electrical contacts for exchanging electrical audio signals with the interchangeable functional module fixed to the wireless microphone.

8. The assistive listening device according to claim 1, wherein the wireless microphone comprises an electronic audio processing module, said electronic audio processing module being connected to one or more of the electrical contacts for receiving electrical control signals from the interchangeable functional module fixed to the wireless microphone.

9. The assistive listening device according to claim 1, wherein the radio transmitter is connected to one or more of the electrical contacts for exchanging electrical signals with the interchangeable functional module fixed to the wireless microphone.

10. The assistive listening device according to claim 1, wherein the rechargeable battery is connected to one or more of the electrical contacts for supplying power to the interchangeable functional module fixed to the wireless microphone.

11. A wireless microphone comprising a rechargeable battery for powering the wireless microphone, a microphone element for receiving audio signals from sound sources, a radio transmitter for transmitting radio signals carrying audio signals to a hearing aid, and an antenna operatively connected to the radio transmitter, wherein the wireless microphone comprises a coupling element for detachably fixing one of various interchangeable functional modules to the wireless microphone, said coupling element comprising electrical contacts for electrically connecting the interchangeable functional module to the wireless microphone when the interchangeable functional module is fixed to the wireless microphone by means of said coupling element, and wherein said interchangeable functional modules include:

a receiver module for receiving wireless communications from a remote device that is remote from both of the wireless microphone and the hearing aid; and a charging module for recharging the rechargeable battery, wherein the receiver module and the charging module can be interchangeably operatively connected to the wireless microphone through said coupling element.

* * * * *